(No Model.)
J. V. ROWLETT.
LAWN MOWER.
No. 479,843. Patented Aug. 2, 1892.
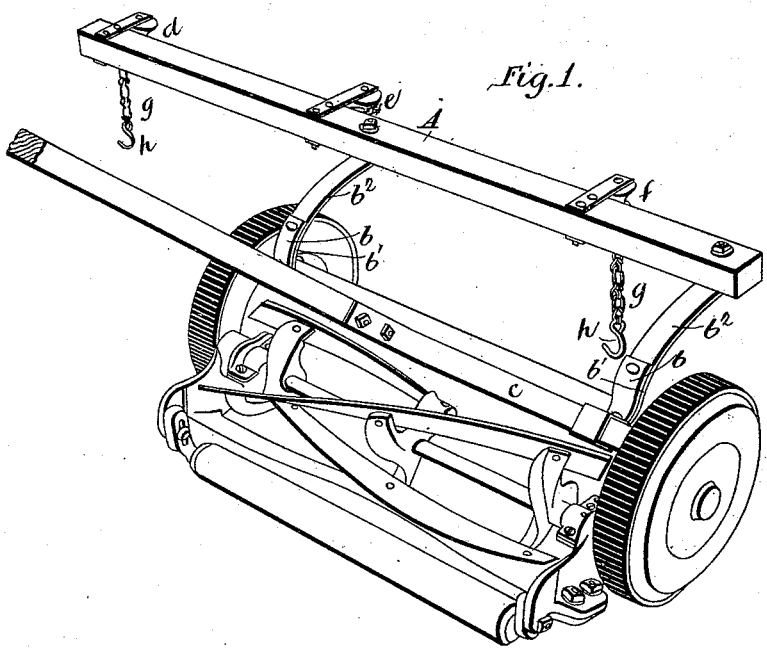
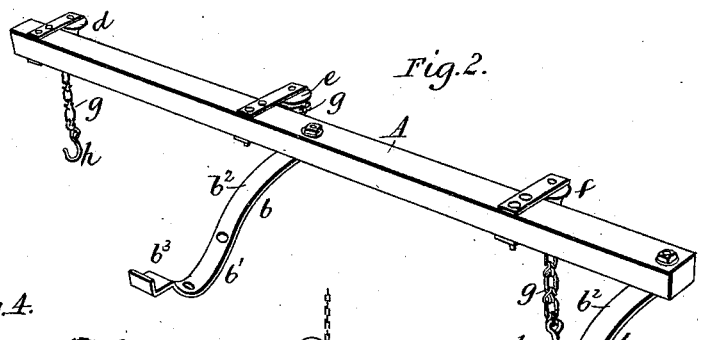
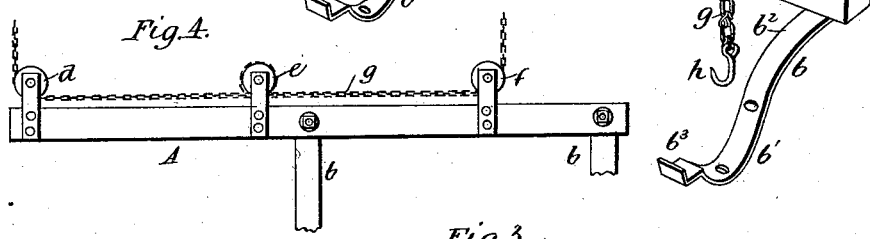
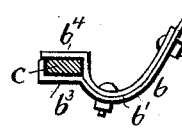
Witnesses: Inventor: Jacob V. Rowlett

UNITED STATES PATENT OFFICE.

JACOB V. ROWLETT, OF RICHMOND, INDIANA.

LAWN-MOWER.

SPECIFICATION forming part of Letters Patent No. 479,843, dated August 2, 1892.

Application filed October 6, 1891. Serial No. 408,072. (No model.)

*To all whom it may concern:*

Be it known that I, JACOB V. ROWLETT, a citizen of the United States, residing at Richmond, in the county of Wayne and State of Indiana, have invented certain new and useful Improvements in Lawn-Mowers; and I do hereby declare the following to be a full, clear, and exact description of the invention, such as will enable others skilled in the art to which it appertains to make and use the same.

My present invention relates to lawn-mowers; and it consists of mechanism of new and novel construction whereby a hand-mower of ordinary construction may be converted into a horse-mower.

In the accompanying drawings, which form a part of this specification, Figure 1 represents in perspective view a lawn-mower with my horse attachment thereon. Fig. 2 is a perspective view of the attachment; Fig. 3, a section of the mower-handle brace and attachment, and Fig. 4 a top view of the attachment.

Like letters of reference refer to like parts throughout the several figures of the drawings.

The letter A denotes the draft-bar, which is preferably of wood and rectangular in cross-section. It is secured to the mower in any desired manner, but preferably by means of the clamps $b$, which are formed in two parts, one of which $b'$ is provided with an arm $b^2$ for holding and supporting the draft-bar and with a jaw $b^3$ for engaging the handle-brace $c$. The other part of the clamp is provided with the jaw $b^4$ and a short extension, which is secured by means of bolts and nuts to the arm $b^2$. The draft-bar is thus held rigidly in place and may be easily connected and disconnected.

In the drawings I have shown the connection of the draft mechanism to the mower at a point to the rear of and above the axle of the drive-wheel of the latter. In this way I obtain the same pressure on the drive-wheel as that imparted during the operation of a mower by hand in the usual manner, and the pressure on the handle-bar by the driver prevents the tipping up of the rear of the machine and a consequently uneven cut. It is evident that this connection could be made at any desired rear point—as, for instance, the sides of the mower—the object being, as before stated, to give the requisite pressure to the drive-wheel and to adapt the mower as nearly as may be to all the conditions which exist in the operation of the machine by hand. The draft-bar is secured in such a manner that one end thereof extends some distance beyond the side of the mower, the path of the horse being in a line about even with the draft-wheel. I have provided means for equalizing the draft, as follows: Secured to the draft-bar in any suitable manner are three rollers $d\ e\ f$, around which is passed a chain $g$, having hooks $h$ in the end thereof for connection with the traces. The chain is passed entirely around the center roller and back of the end rollers, thereby preventing the slipping thereof. The action of this construction is precisely the same in operation as a whiffletree and overcomes the swinging motion of the horse.

By my invention I am enabled at a very small expense and little labor to convert a hand lawn-mower into a horse-mower and to obtain results with my machine which equal the work of a regular horse lawn-mower.

My invention is especially adapted to heavy hand-mowers from twenty to thirty inches cut, and by reason of the construction of the connecting devices the attachment may be made to suit any size of machine desired.

I claim as my invention—

1. In combination with a hand lawn-mower, a horse-attaching device therefor comprising a draft-bar and accessories, substantially as described, and supporting-arms connected at one end to said bar and at the other end to the mower at a point to the rear and above the axle of the drive-wheel, for the purpose set forth.

2. In a lawn-mower, a horse-attaching device consisting of a draft-bar and supporting-arms therefor having clamps in their ends for connection with the handle-brace, as described.

3. In combination with a hand lawn-mower, a horse-attaching device therefor comprising a draft-bar and accessories, substantially as described, supporting-arms connecting said bar with the mower at a point to the rear and above the axle of the drive-wheel, a set of rollers arranged on said bar, and a draft-chain adapted to pass around said rollers, and operating in the manner and for the purpose set forth.

4. In a horse-attaching device for lawn-mowers, the combination, with the draft-bar, of the supporting-arms therefor having connection with the handle-brace, and the rollers $d$ $e$ $f$, and the draft-chain adapted to pass around said rollers and provided with hooks for connection with the traces, all substantially as described.

In testimony whereof I affix my signature in presence of two witnesses.

JACOB V. ROWLETT.

Witnesses:
CHAS. C. GEHRING,
EDWIN S. ROWLETT.